April 14, 1970　　　H. A. ANDERSON　　　3,505,889
DRIVE MEANS FOR RECORDER

Filed May 22, 1968　　　　　　　　　　　　　　2 Sheets-Sheet 1

*Inventor:*
HILDING A. ANDERSON
Joseph J. Gran
*Attorney*

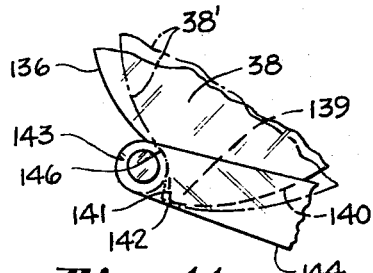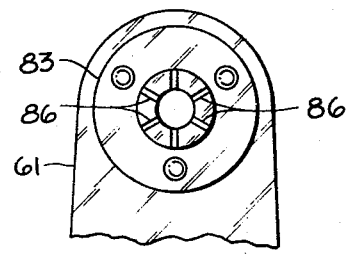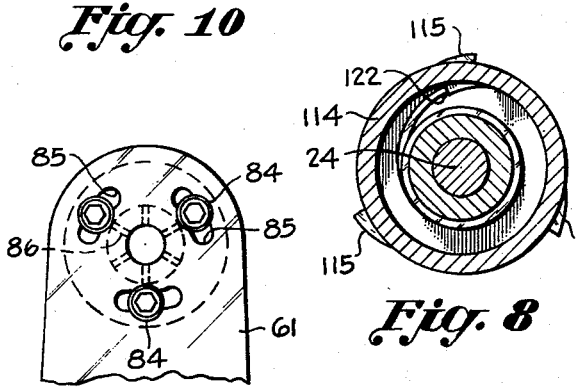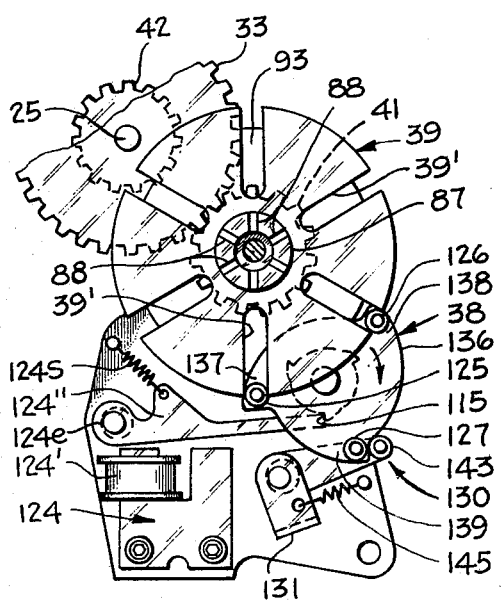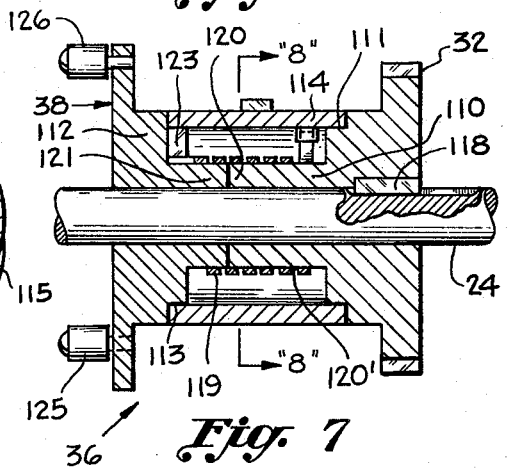

United States Patent Office 3,505,889
Patented Apr. 14, 1970

3,505,889
DRIVE MEANS FOR RECORDER
Hilding A. Anderson, Lake Zurich, Ill., assignor to SCM Corporation, New York, N.Y., a corporation of New York
Filed May 22, 1968, Ser. No. 731,101
Int. Cl. F16h 1/44, 27/00
U.S. Cl. 74—125.5                                    18 Claims

ABSTRACT OF THE DISCLOSURE

There is disclosed drive means for a recorder including a clutch selectively operable to drive a Geneva mechanism which in turn drives record feed wheels through a planetary gear mechanism. The planetary gear mechanism can be operated to effect either single or multiple line feed of a record medium.

BACKGROUND OF THE INVENTION

Field of the invention

This invention relates to drive means for a recorder and in particular to mechanism for accomplishing either single or multiple line feed of record medium in a recorder.

Description of the prior art

Various pawl and ratchet mechanisms for accomplishing either single or multiple line feed of a record medium are known in the art.

SUMMARY OF THE INVENTION

The invention provides a speed change mechanism connected to input means and output means. By coupling or locking the input means, the speed charge mechanism, and the output means together as a unit, no change of speed between the speed of the input means and the speed of the output means is effected; but by drivingly coupling the input means to the output means through that speed change mechanism, speed change is effected. It is preferred to use a planetary gear mechanism as the speed change mechanism. The Geneva mechanism provides positive drive in accordance with Geneva motion. A clutch is selectively operable to drive the Geneva and speed change mechanisms. The invention is particularly useful in or for a recorder to provide drive of recorder components at selected time intervals.

BRIEF DESCRIPTION OF THE DRAWINGS

FIGURE 6 is a sectional view taken along line 6—6 of FIGURE 3;

FIGURE 7 is a sectional view of a clutch shown in FIGURES 1, 3 and 6;

FIGURE 8 is a sectional view taken along line 8—8 of FIGURE 7;

FIGURE 9 is a fragmentary view showing a portion of the frame and a portion of the drive mechanism shown in FIGURE 3, depicting structure enabling a grooved plate to be adjusted;

FIGURE 10 is a fragmentary view showing the other side of the frame and plate shown in FIGURE 9; and FIGURE 11 is a fragmentary view illustrating the effect of a detent on a drive member of a Geneva mechanism.

DESCRIPTION OF THE PREFERRED EMBODIMENT

Figure 1:
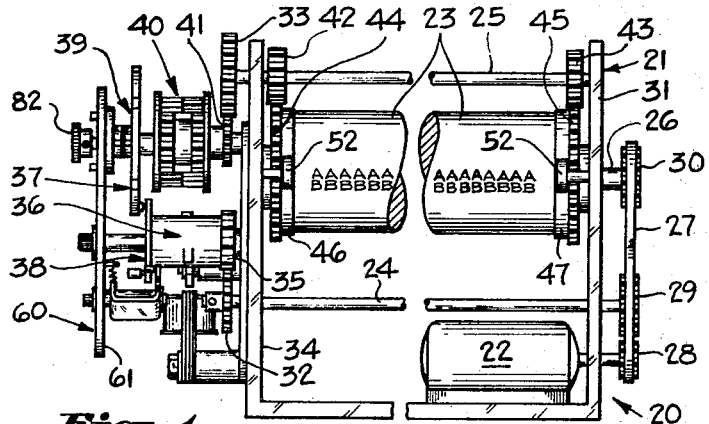
FIGURE 1 is a fragmentary view of a recorder, specifically a teleprinter, embodying a drive mechanism in accordance with the invention.
Figure 2:
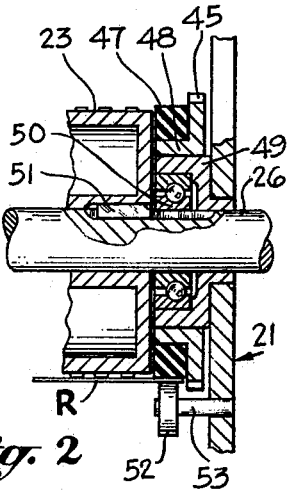
FIGURE 2 is a fragmentary sectional view of the recorder shown in FIGURE 1, depicting one set of record medium engaging feed wheels.

Referring now to FIGURE 1 of the drawings, there is shown a fragmentary portion of a recorder generally indicated at 20 which specifically is a telegraphic printing apparatus or teleprinter. The recorder 20 has a frame 21 which mounts an electric drive motor 22, drive shafts 24 and 25, and a drive shaft 26 which carries a print drum 23. The electric motor 22 drives a toothed belt 27 through a toothed pulley 28. The belt 27 is in driving engagement with a toothed pulley 29 secured to the shaft 24 and a toothed pulley 30 secured to the print drum drive shaft 26. The pulleys 28, 29 and 30 are shown to be disposed outside the frame 21 adjacent frame side plate 31. Gears 32 and 33 are shown to be disposed outside the frame 21 adjacent frame side plate 34. The gears 32 and 33 are secured to shafts 24 and 25, respectively. The gear 32 meshes with a gear 35 which constitutes the input to a clutch 36. The clutch 36, which is shown to be of the wrapped-spring type, is selectively engageable to drive a Geneva mechanism, generally indicated at 37, which includes a Geneva driving member 38 and a Geneva driven member 39. The driven member 39 provides an input to a planetary speed change mechanism generally indicated at 40. The output of the mechanism 40 drives a gear 41 which meshes with the gear 33. The gear 33 drives the shaft 25 and gears 42 and 43 secured to the shaft 25. The gears 42 and 43 drive gears 44 and 45 and feed wheels 46 and 47, respectively. Only the right side of the drum 23, the feed wheel 47, the gear 45 and bearing structure is shown in FIGURE 2, as the left side is identical to it. The gear 45 is composed of a plastic material and has an annular flange or hub 48. The wheel 47 is adhesively secured to the hub 48 so that the feed wheel 47 rotates together with the gear 45. A bearing 49 has an outer bearing surface about which the hub 48 can rotate. A ball bearing 50 is disposed between the bearing 49 and the shaft 26. The print drum 23 is secured to the shaft 26 by a key 51. A pressure roll 52 is freely rotatable about a shaft 53 mounted by the frame 21. The record medium R is pressed between the roll 52 and the feed wheel 47, thereby causing the record medium R to be fed or advanced whenever the feed wheel 47 is driven. As both feed wheels 46 and 47 rotate through the same angle at the same time, driving force is applied to each marginal side edge of the record medium R. The feed wheels 46 and 47 are composed of a material having a high coefficient of friction. The feed wheels 46 and 47 can be provided with feed pins (not shown) for driving a record medium (not shown) having feed holes.

Figure 3:
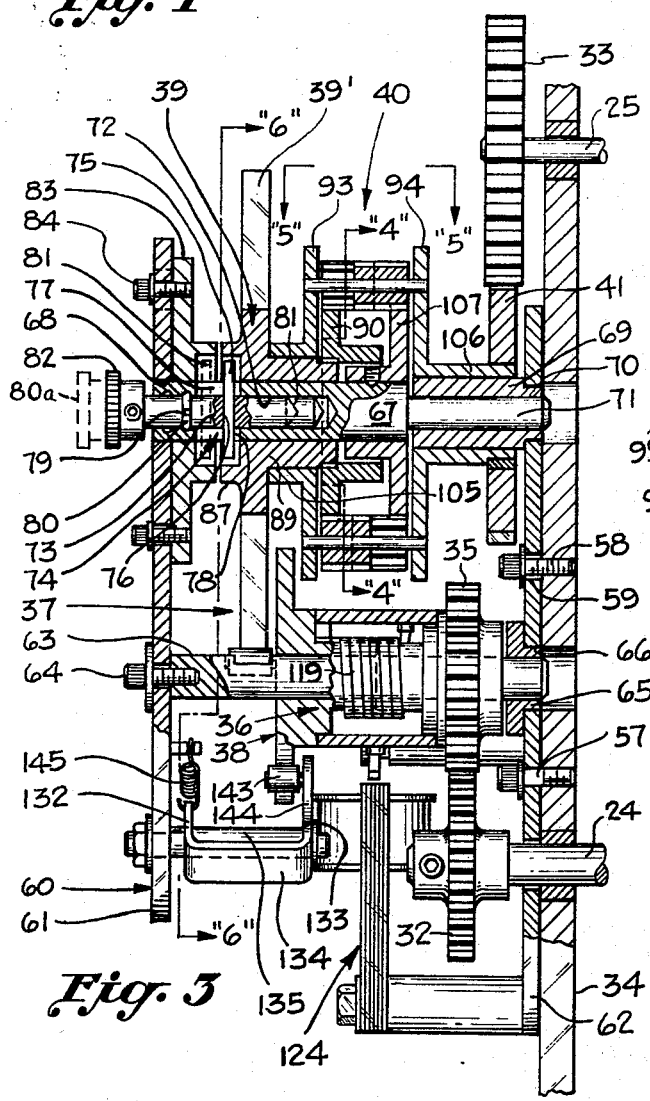
FIGURE 3 is an enlarged sectional view of a portion of the drive mechanism shown in FIGURE 1.
Figure 4:
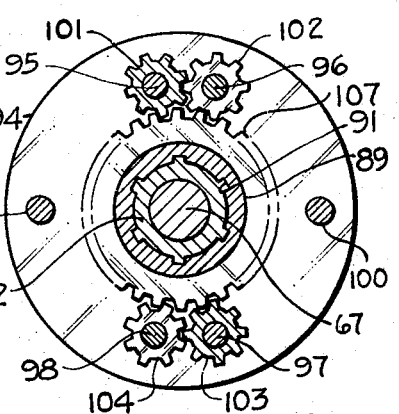
FIGURE 4 is a sectional view taken along line 4—4 of FIGURE 3.
Figure 5:
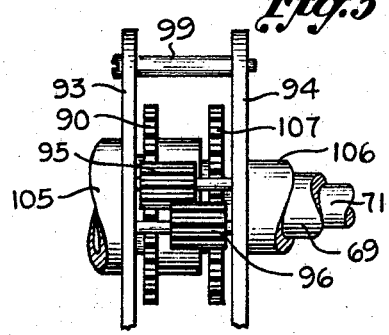
FIGURE 5 is a sectional view taken along line 5—5 of FIGURE 3.

Referring now to FIGURE 3, there is shown a frame 60 including frame members 61 and 62. The frame 60 is mounted to the side plate 34 by a pivot screw 57. When the frame 60 is so positioned that gear 41 meshes properly with the gear 33, a screw 58 which passes through an enlarged bore 59 in the frame member 62 is tightened. Thus, the frame 60 is adjustable relatively to the gear 33. A shaft 63, secured to the frame member 61 by a threaded fastener 64, is press fitted into a bushing 65, which in turn is press fitted into a bore 66 in the frame member 62. A shaft 67 is rotatably mounted in a bore 68 in the frame member 61. A bearing 69 is press fitted into a bore 70 in the frame member 62. The bearing 69 provides a bearing surface for end portion 71 of the shaft 67. The shaft 67 has a lengthwise extending bore 72 in which a rod or coupling member 73 is mounted for limited sliding movement. The shaft 67 has an elongated bore 74 extending transversely through its center. A pin 75 is press fitted into a bore 76 passing transversely through the center of the coupling member 73. The shaft 67 has spaced-apart elongated slots 77 and 78 which open to the bore 72. The pin 75 can move lengthwise in the slots 77 and 78 in the shaft 67, but prevents the member 73 from rotating relative to the shaft 67.

The member 73 has an external groove 79 which receives a resilient C-ring 80. The member 73 can be shifted from the solid-line position shown in FIGURE 3 to the phantom-line position indicated by lines 80a and 81 by exerting a pulling force on the knob 82. The member 73 can be moved from the phantom-line position to the solid-line position in FIGURE 3 by pushing on the knob 82. The elongated slot 74 is only wide enough to permit the pin 75 to be moved from one of these positions to the other position, and vice versa, in that there is only sufficient clearance between the pin 75 and the sides of the slot 74 to prevent binding.

A slotted plate 83 is adjustably secured to the frame member 61 by threaded fasteners 84, as best shown in FIGURES 9 and 10. Thus, the angular position of the slotted plate 83 can be varied with respect to the frame member 61 by rotating the plate 83 relative to the shaft 67 and the frame member 61. Arcuate slots 85 in the frame member 61 provide this adjustment when the threaded fasteners 84 are loosened. The threaded fasteners 84, upon being tightened, clamp the plate 83 to the frame member 61. The plate 83 is shown to have six radial grooves or slots 86. The pin 75 can fit into opposed slots 86 with the minimum of clearance sufficient to prevent binding, so that the pin 75 prevents rotation of the shaft 67 with respect to the plate 83 and the frame member 61. As best shown in FIGURES 3 and 6, the driven Geneva member 39 has a hub portion 87 provided with six radial grooves or slots 88. The slots 88 have the same angular positions, size and relationship to each other as do the slots 86 in the member 83. Thus, the pin 75 can be moved directly from the phantom-line position shown in FIGURE 3 to the solid-line position by pressing on the knob 82, the pin 75 being free to move into opposed slots 88 in the hub portion 87 of the driven Geneva member 39. The plate 83 can be adjusted so that the slots 86 are in alignment with the slots 88. The driven Geneva member 39 is rotatably received at its hub portion 89 about the shaft 67. A sun gear 90 having a splined bore 91 is connected to a splined end 92 of the hub portion 89. Thus, the driven Geneva member 39 and the sun gear 90 are always locked together, so that when the driven Geneva member 39 rotates, the sun gear 90 will also rotate the same angular amount, and when the driven Geneva member 39 is stationary, the sun gear 90 will also be stationary. The planetary gear mechanism 40 includes the sun gear 90, a pair of opposed plates 93 and 94 and opposed sets of planet gears 95 and 96 and 97 and 98. The plates 93 and 94 are rigidly secured to each other by tie rods 99 and 100. Pins 101, 102, 103 and 104 about which gears 95, 96, 97 and 98 are rotatably mounted also serve to hold the plates 93 and 94 fixed relative to each other. The plate 93 has a hub 105 which is rotatably mounted about hub portion 89 of the driven Geneva member 39. The plate 94 has a hub 106 which is rotatable on the bearing 69. The gear 41 is secured to the hub 106. The planet gears 95 and 97 mesh with the sun gear 90 and with planet gears 96 and 98. The planet gears 96 and 98 mesh with a fixed sun gear 107. The sun gear 107 is secured to the shaft 67. As the shaft 67 can be coupled to the driven Geneva member 39 by virtue of the pin 75 being in opposed slots 88 in the hub portion 87, the sun gear 107 can be effectively fixed or made nonrotatable with respect to the driven Geneva member 39.

If the pin 75 is in the phantom-line position shown in FIGURE 3, the sun gear 107 as well as the shaft 67 are fixed or nonrotatable with respect to the frame member 61. Thus, as the Geneva driven member 39 is driven by the Geneva driving member 38, either single or double line feed can be accomplished, depending upon whether the pin 75 is in the position shown in phantom lines or in the position shown in solid lines, respectively, in FIGURE 3.

With reference to FIGURES 7 and 8, the gear 32 rotates continuously as the motor 22 continuously drives the shaft 24. The gear 32 can be formed integrally with a stepped hub 110, as shown, or it can be made integral as by welding it to a separate hub, if desired. The hub 110 has a shoulder 111, and the Geneva driving member 38 has a stepped hub 112 with a shoulder 113. An annular clutch sleeve 114 is rotatably received by the hubs 110 and 112 and makes a rotatable fit with the shoulders 111 and 113. The sleeve 114 has three equally angularly spaced teeth 115. The hub 112 of the Geneva drive member 38 is rotatably mounted about the shaft 24, whereas the hub 110 of the gear 32 is suitably secured to the shaft 24 as by a key 118. A wrapped spring 119 encircles hub portions 120 and 121. One terminal end of the spring 119 abuts against an internal shoulder or stop face 122 of the sleeve 114, and the other end of the spring 119 terminates in a radial notch 123 in the hub 112 as shown in FIGURES 3 and 6.

With reference to FIGURE 6, while a pawl 124" is in engagement with the tooth 115, the spring 119 is held out of clutching engagement with the clutch surface 120' of the clutch element 120. Thus, the Geneva driving member 38 is not driven. When a coil 124' of an electromagnet generally indicated at 124 is energized, the pawl 124" is attracted and pivoted clockwise as viewed in FIGURE 6, thereby clearing the tooth 115. The pawl 124" is pivotally mounted on eccentric pivot 124e by which the pawl 124" is adjustable relative to the teeth 115. As soon as the pawl 124" clears the tooth 115, the spring 119 clutches the clutch surface 120' and drives the Geneva driving member 38. The number of teeth 115 is equal to the number of pins or rollers 125, 126 and 127 carried by and forming part of the Geneva driving member 38. The electromagnet 124 is de-energized immediately after being energized so that the pawl 124" can catch the next successive tooth 115 which is presented upon rotation of the sleeve 114. While the clutch 36 is engaged, the pin or roller 125 drives the Geneva driven member 39. When the pawl 124" is in abutment with the next tooth 115, the pins 126 and 127 move into the position formerly occupied by the pins 125 and 126.

A detent generally indicated at 130 includes a generally U-shaped member 131 having spaced-apart legs 132 and 133 joined by a bight 134. An eccentrically mounted pin 135 extending through legs 132 and 133 pivotally mounts the U-shaped member 131 and provides for adjustment of the position of its pivot point with respect to the outer camming surface 136 of the Geneva driving member 38. As best shown in FIGURE 6, the camming surface 136 of the Geneva driving member 38 has three identical lobes 137, 138 and 139. One lobe 139 is shown in detail in FIGURE 11 to have a gradual rise portion 140 joined to a steep fall portion 141 at a point 142. The roller 143 is connected to the U-shaped member 131 by an arm 144. When the clutch 36 is operated, it drives the Geneva driving member 38 through one-third of a revolution, the pin or roller 143 passes the point 142 at almost the very end of the one-third revolution. As the roller 143 passes the point 142 a spring 145 biases the U-shaped member 131 counterclockwise as viewed in FIGURE 6 until the roller 143 engages a recess 146 in the camming surface 136. The pawl 124" engages the next tooth 115 immediately after the roller 143 passes the point 142 but before the roller 143 engages the recess 146, thereby disengaging the clutch 36. The small additional amount of rotation of the member 38 effected by the roller 143 acting against the fall portion 141 after the clutch 36 has become disengaged causes the spring 119 to unwind even more, thereby reducing the frictional drag between the clutch surface 120' and the spring 119. This reduction in frictional drag not only minimizes wear, it also decreases the load on the motor 22 when the clutch 36 is disengaged. The Geneva driving member 38 is also shown in a slightly different angular position by phantom lines 38'. The phantom lines 38' depict the position which the driving member 38 would occupy if the detent 130 were omitted. The detent 130 also serves to accurately locate the driving member 38 so that when the clutch 36 is disengaged two of the three rollers of the group of rollers 126, 127 and 128 will always be at the entrance of adjacent slots 39' in the Geneva driven member 39. As best shown in FIGURE 6, the outer periphery of the driven member 39 passes through the center lines of the rollers 125 and 126. The member 39 is thus locked against rotation.

In use, assume that single line feed is desired, that the button 82, the member 73 and the pin 75 are in the positions shown by phantom lines 80a and 81, and that the motor 22 is operating. The motor 22 continuously drives the pulleys 28, 29 and 30 which are interconnected by the belt 27. The print drum 23 is continuously driven and print hammer means (not shown) cooperates with the type on the drum 23 to effect recording on the record medium R. The shaft 24 continuously drives the gear 32, which in turn continuously drives the gear 35. When the pawl 124" is in engagement with a tooth 115 on the outer periphery of the clutch sleeve 114, no drive motion is imparted to the Geneva driving member 38. As soon as the electromagnet 124 is energized, the pawl 124" is pulled out of engagement with the tooth 115, thereby enabling the spring 119 to be in clutching engagement with the surface 120' to effect rotation of the sleeve 114 and the driving member 38. As the sleeve 114 rotates, a spring 124s causes the pawl 124" to ride against the outer surface of the sleeve 114. When the next successive tooth 115 meets the pawl 124", rotation of the sleeve 114 is stopped, thereby causing disengagement or unclutching of the clutch 36. While the Geneva driving member 38 rotates one-third of a revolution, driving motion is imparted to the Geneva driven member 39 by the one roller 125, 126 or 127 which is in driving engagement with it. The instant the Geneva driving member 38 starts its rotational movement, one pin, such as the pin 125 shown in FIGURE 6, will cooperate with the guide slot 39' and drive the Geneva driven member 39 through one-sixth of a revolution. The other pin or roller 126 will immediately leave the position shown in FIGURE 6 at the entrance of the slot 39'. After the one-sixth of a revolution has been completed, the roller 126 which drives the driven member 39 will serve as a locking roller to prevent rotation of the driven member 39, and the next successive roller 127 will be ready to drive the driven member 39 as soon as the clutch 36 is engaged again; and so on. The driven member 39 is always driven one-sixth of a revolution regardless of whether single or double line feed is to be accomplished. Therefore, the time required to either single or double line feed is always the same. As the drive mechanism is set for single line feed, the coupling formed by member 73 and pin 75 locks the shaft 67 to the frame member 61 because the pin 75 engages in slots 86 in the plate 83. Because the shaft 67 cannot rotate, the gear 107 secured to the shaft 67 also cannot rotate. Thus, as the driven member 39 is driven, it drives the sun gear 90, which in turn drives sets of planet gears 95 and 96, and 97 and 98. Speed reduction is accomplished in that the sun gear 90 rotates through a greater angle than the plates 93 and 94 which are driven by the planet gears 95 through 98. In the illustrated embodiment, a two-to-one speed reduction is accomplished by virtue of sun gear 90 having twenty-four teeth and each of the planet gears 95 through 98 having eight teeth. While the sun gear 90 rotates, the planet gears 95 through 98 and the plates 93 and 94 can rotate about the fixed sun gear 107. The fixed gear 107 is shown to be a spur gear; however, the gear 107 can be a ring gear, if desired. When the gear 41 rotates, rotational movement is imparted to the feed wheels 46 and 47 via gear 33, the shaft 25, gears 42 and 43, and gears 44 and 45.

Assume now that double line feed is to be effected; the same general sequence of operations is existent, except as follows: the button 82 and the shaft 73 are moved to the position shown by solid lines in FIGURE 3, thereby fixing the gear 107, the shaft 67 and the driven member 39 to each other so that they rotate as a unit. When the driven member 39 is driven, the entire planetary gear mechanism 40 rotates without any speed reduction taking place between the driven member 39 and the gear 41, thereby effecting double line feed. A planetary gear mechanism is preferred as the speed change mechanism in that it is relatively compact and lightweight. As the entire planetary gear mechanism rotates in the double line feed conditions, it is an advantage to have the entire planetary gear mechanism balanced. Balancing is effected by having opposed sets of planet gears. Balance can also be effected by use of a single planet gear set if the planetary gear mechanism is balanced, as for example by a suitable weight.

Other embodiments and modifications of this invention will suggest themselves to those skilled in the art, and all such of these as come within the spirit of this invention are included within its scope as best defined by the appended claims.

I claim:

1. For a recorder: record medium feed means engageable with a record medium, means including a planetary gear mechanism for driving said feed means by either single or multiple increments, said driving means having input means and output means for said planetary gear mechanism, and means for selectively operating said planetary gear mechanism, and means for selectively operating said planetary gear mechanism for effecting change in drive ratio between said input means and said output means and for effecting no change in drive ratio between said input means and said output means.

2. The invention as defined in claim 1, said planetary gear mechanism including sun and planet gears, said selectively operating means including means for alternately drivingly coupling said input means directly to said output means by locking said planet and sun gears against relative rotation and for drivingly coupling said input means to said output means through said planet and sun gears.

3. The invention as defined in claim 1, wherein said driving means further includes a Geneva mechanism.

4. The invention as defined in claim 1, further including a selectively engageable clutch.

5. For a recorder: a planetary gear mechanism including a sun gear and a planet gear meshing with said sun gear, input means for driving one of said gears, output means for alternately connecting said input means directly to said output means so that the speed of said output means is the same as the speed of said input means and for connecting said input means to drive said output means through said sun and planet gears to effect a change in speed between the speed of said input means and said output means, and means engageable with a record medium and operatively connected to said output means for advancing the record medium.

6. The invention as defined in claim 5, including frame means, said planetary mechanism further including a fixed gear meshing with said planet gear, said connecting means including means for coupling said fixed gear either to said input means or to said frame means.

7. The invention as defined in claim 5, said planetary gear mechanism having means for driving said output means in the same direction regardless of whether said input means is connected directly to said output means or to said output means through said planetary gear mechanism.

8. For a recorder: a planetary gear mechanism including a sun gear and a planet gear meshing with said sun gear, input means for driving one of said gears, output means, means for alternately connecting said input means directly to said output means so that the speed of said output means is the same as the speed of said input means and for connecting said input means to drive said output means through said sun and planet gears to effect a change in speed between the speed of said input means and said output means, a Geneva mechanism having driving means with at least two pin means and a cooperating driven member having at least three slot means, and means for selectively driving said driving member, two of said pin means being partially within two of said slots when said driving member is not being driven by said selective drive means to prevent movement of said driven member.

9. For a recorder: a planetary gear mechanism including a sun gear and a planet gear meshing with said sun gear, input means for driving one of said gears, output means, means for alternately connecting said input means directly to said output means so that the speed of said output means is the same as the speed of said input means and for connecting said input means to drive said output means through said sun and planet gears to effect a change in speed between the speed of said input means and said output means, a Geneva mechanism having a Geneva driving member and having a Geneva driven member constituting said input means, and wrapped spring clutch means for selectively driving said Geneva driving member, said clutch means having an expandable spring for selectively clutching and unclutching with a clutch surface, and means for causing said spring to expand to effect unclutching and additional means for causing said spring to be even further out of clutching engagement with said clutch surface.

10. For a recorder: a speed change mechanism, input means and output means for said speed change mechanism, means for alternately coupling said input means, said speed change means and said output means together as a unit to effect no change of speed between said input means and said output means and for coupling said input means to said output means through said speed change mechanism to effect change of speed between said input means and said output means, and means engageable with a record medium and operatively connected to said output means for advancing the record medium.

11. For a recorder: record medium feed means engageable with a record medium, means including a planetary gear mechanism for driving said feed means at two different speeds, said driving means having input means and output means for said planetary gear mechanism, and means for selectively operating said planetary gear mechanism for effecting a speed change between said input means and said output means and for effecting no speed change between said input means and said output means.

12. The invention as defined in claim 8, said driving means further including a Geneva mechanism having a Geneva driving member and a Geneva driven member, a selectively operable clutch for driving said Geneva driving member.

13. The invention as defined in claim 8, wherein said driving means further includes a Geneva mechanism.

14. The invention as defined in claim 8, said driving means further including a selectively operable clutch.

15. The invention as defined in claim 10, wherein said input means and said output means are rotatably mounted.

16. The invention as defined in claim 10, wherein said speed change mechanism includes a planetary gear mechanism.

17. For a recorder: record medium feed means engageable with a record medium, and means including a planetary gear mechanism for driving said feed means by either single or multiple increments, said driving means further including a Geneva mechanism having a Geneva driving member and a Geneva driven member, and a selectively operable clutch for driving said Geneva member, said Geneva driven member constituting said input means.

18. For a recorder: record medium feed means engageable with a record medium, means including a planetary gear mechanism for driving said feed means by either single or multiple increments, stationary frame means, said driving means further including input means and output means for said planetary gear mechanism and shaft means mounted by said frame means, said input means, output means and planetary gear mechanism being mounted by said shaft means, said planetary gear mechanism including meshing sun and planet gears and a fixed gear meshing with said planet gear, said fixed gear being secured to said shaft means, and means alternately connecting said shaft means to said input means and to said frame means.

References Cited

UNITED STATES PATENTS

| 2,922,314 | 1/1960 | Johnson et al. | 74—781 |
| 3,136,168 | 6/1964 | Matovich | 74—125.5 |

FOREIGN PATENTS

| 352,729 | 4/1961 | Switzerland. |
| 666,886 | 5/1939 | Germany. |

MARK M. NEWMAN, Primary Examiner

W. S. RATLIFF, Jr., Primary Examiner

U.S. Cl. X.R.

74—781, 436

PO-1050
(5/69)

UNITED STATES PATENT OFFICE
CERTIFICATE OF CORRECTION

Patent No. 3,505,889           Dated April 14, 1970

Inventor(s) Hilding A. Anderson

It is certified that error appears in the above-identified patent and that said Letters Patent are hereby corrected as shown below:

Colunn 1, line 35, "charge" should read --change--.

Claim 5, column 6, line 57, --means,-- should follow "output".

SIGNED AND
SEALED
AUG 11 1970

(SEAL)
Attest:

Edward M. Fletcher, Jr.
Attesting Officer

WILLIAM E. SCHUYLER, JR.
Commissioner of Patents